United States Patent [19]

Purkapile

[11] Patent Number: 4,934,485

[45] Date of Patent: Jun. 19, 1990

[54] COMBINATION LADDER AND HAND TRUCK

[75] Inventor: Emerson J. Purkapile, Chicago, Ill.

[73] Assignees: Robert Pease, Scarsdale; Kenneth Feeser, Amityville, both of N.Y.

[21] Appl. No.: 153,739

[22] Filed: Feb. 8, 1988

[51] Int. Cl.[5] ........................ B62B 1/20; E06C 1/397; E06C 7/16

[52] U.S. Cl. ........................................ 182/20; 182/104; 280/30; 280/47.28

[58] Field of Search ...................... 182/20, 21, 22, 129, 182/104; 403/97; 280/30, 47.28

[56] References Cited

U.S. PATENT DOCUMENTS

| | | | |
|---|---|---|---|
| 3,104,889 | 9/1963 | Branch | 182/20 |
| 3,412,420 | 11/1968 | Seckerson | 16/146 |
| 3,545,786 | 12/1970 | Yeder | 403/97 |
| 3,586,355 | 6/1971 | Magi | 287/14 |
| 3,643,292 | 2/1972 | Mayer | 16/144 |
| 3,655,012 | 4/1972 | Hoffman et al. | 187/163 |
| 3,779,655 | 12/1973 | Toyota | 403/93 |
| 3,811,151 | 5/1974 | Kuemmerlin | 16/144 |
| 3,811,715 | 5/1974 | Brudy | 403/93 |
| 3,847,488 | 11/1974 | Gossage | 403/79 |
| 3,861,499 | 1/1975 | Follett, Jr. | 182/163 |
| 3,879,146 | 4/1975 | Mayer | 403/93 |
| 3,904,298 | 9/1975 | Lindgren | 403/93 |
| 3,955,240 | 5/1976 | Schuh et al. | 16/144 |
| 4,070,058 | 1/1978 | Muehling | 297/374 |
| 4,089,084 | 5/1978 | Droz | 16/128 R |
| 4,152,810 | 5/1979 | Martinez | 16/144 |
| 4,157,128 | 6/1979 | Peters | 182/24 |
| 4,216,844 | 8/1980 | Klafs | 182/104 |
| 4,226,549 | 10/1980 | Batt | 403/92 |
| 4,236,753 | 12/1980 | Ooshiro et al. | 297/364 |
| 4,253,546 | 3/1981 | Uchida | 182/20 |
| 4,258,826 | 3/1981 | Murray | 182/20 |
| 4,290,168 | 9/1981 | Binge | 16/175 |
| 4,335,625 | 6/1982 | Nishikawa | 74/493 |
| 4,403,373 | 9/1983 | Kümmerlin | 16/327 |
| 4,407,045 | 10/1983 | Boothe | 16/327 |
| 4,428,458 | 1/1984 | Fiore et al. | 182/116 |
| 4,474,264 | 10/1984 | Krause | 182/163 |
| 4,494,626 | 1/1985 | Ast | 182/20 |
| 4,540,306 | 9/1985 | Wang | 403/93 |
| 4,543,006 | 9/1985 | Wang | 403/93 |
| 4,543,007 | 9/1985 | Quiogue | 403/97 |
| 4,566,150 | 1/1986 | Boothe | 16/332 |
| 4,577,986 | 3/1986 | Wang | 403/93 |
| 4,602,889 | 7/1986 | Mu-Shan | 403/91 |
| 4,653,371 | 2/1987 | Wang | 403/93 |
| 4,773,503 | 9/1988 | Purkapile | 182/22 |

OTHER PUBLICATIONS

Brochure—"Flex-o-Ladder ® Pro—The Difference in Safe, Reliable, Dependable and Convenient Performance," (pub. by Tool America, Inc. 1987).

*Primary Examiner*—Reinaldo P. Machado
*Attorney, Agent, or Firm*—Pennie & Edmonds

[57] ABSTRACT

A combination foldable ladder and hand truck is disclosed comprising a plurality of ladder sections joined at respective ends by hinges and having retractable transport wheels and a retractable support means. The device is functional as a step ladder as well as an extension ladder in an open position with the support means and transport wheels each in their retracted positions. The device is functional as a hand truck in a closed position with the support means in an extended forward position for supporting goods and the transport wheels in an extended downward position, for rolling.

31 Claims, 9 Drawing Sheets

COMBINATION LADDER AND HAND TRUCK

CROSS REFERENCE TO RELATED APPLICATIONS

This application is a continuation-in-part of U.S. Pat. Application Ser. No. 096,425, filed Sept. 11, 1987, now U.S. Pat. No. 4,773,503 entitled "Ladder Hinge," the content of which is expressly incorporated herein by reference.

TECHNICAL FIELD

The present invention relates to improvements in ladders and hand trucks and more particularly to a combination foldable ladder and hand truck.

BACKGROUND ART

Ladders are commonly used for a variety of applications and are of two general types. One type is a folding ladder, commonly called a step ladder, which is self supporting. Step ladders are typically used for such tasks as pruning, painting ceilings, or other similar tasks where it may be impossible to lean the ladder against a structure for support. The other type of ladder which is well known is the straight extension ladder. This type of ladder is simply leaned against the wall or some other structure and stood or climbed upon.

Ladders which are constructed so that they may be used as both step ladders and as straight extension ladders have long been known in the art. Typically, such ladders are constructed with hinges in the middle of the side rails. The hinges permit the ladder to be folded into a step ladder configuration or unfolded into a straight extension ladder configuration. Such ladders, commonly referred to as combination step and extension ladders, are very versatile and they combine the desirable features of both types of ladders.

Further improvements on such step ladders include foldable ladders or ladders which are adjustable to a variety of positions so that they can be used as scaffolding or for other support configurations. Such foldable or adjustable ladders include two or more adjustable locking hinges which enable the ladder to conform to the desired positions.

Hand trucks are also known in the art and are commonly used for transporting a variety of goods. Typical hand trucks comprise a pair of spaced apart wheels, each wheel rotatably attached to one end of a side rail. An opposite end of each side rail terminates in a handle means which an operator grasps in order to direct and control the hand truck. A support platform is provided extending forward of the wheels, attached to the side rails and perpendicular to the side rails. The support platform is provided to hold whatever goods are to be transported. Bracing means such as cross members or the like are attached to and extend between the side rails. Such bracing means serve to structurally reinforce the hand truck and provide support to hold the goods to be transported.

The wheels of known hand trucks are generally positioned with respect to the support platform and side rails such that when the hand truck is in a vertically upright position, the support platform rests on the floor and the wheels are positioned slightly above the floor. Inadvertent rolling is thus prevented by preventing wheel contact with the floor during storage in a vertically upright position. Slightly tilting the hand truck rearward will cause the wheels to contact the floor and the support platform to move away from the floor, thus enabling rolling of the hand truck.

Hand trucks and ladders, particularly step ladders, are becoming increasingly common in households. Although most households indeed have some type of step ladder, such ladder is generally used infrequent enough so as to warrant its storage in some type of storage place.

Unfortunately, lack of adequate storage space has become of increasing concern in view of the increased number of city dwellers, lack of adequate housing, large number of condominiums and cooperative apartments and the general need to stabilize the cost of new construction.

Such a lack of adequate storage space has contributed to the above mentioned improvements in foldable ladders, i.e. ladders which are sectionally collapsible so as to be easily stored.

In addition to the lack of adequate storage space, a need for ease of transportability has led to the concept of foldable ladders. Clearly, men, women and children may more easily transport a short folded ladder rather than a long non-folded ladder.

Unfortunately, the advantage of foldability is often accompanied by the disadvantage of additional weight. Such additional weight generally arises due to the requirement of additional materials to insure structural stability and sturdiness of the hinge means.

Thus, a combination foldable ladder and hand truck is desirable, having the advantages of relative lightweight, transportability, structural stability, collapsability and use both as a ladder and a hand truck.

SUMMARY OF THE INVENTION

The present invention relates to a combination foldable ladder and hand truck comprising a plurality of ladder sections, each such section having a pair of spaced apart side rails; a plurality of spaced apart rungs joining the pair of spaced apart side rails; hinge means connecting a first end of a first ladder section to a first end of a second ladder section, said first ladder section being movable away from said second ladder section in an open position and said first ladder section being parallel to and adjacent said second ladder section in a closed position; support means for supporting goods, said support means having a retracted position at least partially within said side rails of said first ladder section and said side rails of said second ladder section and an extended forward position at least partially extending forward of said first and second pair of spaced apart side rails; and a pair of transport wheels having a retracted position in which second ends of said first and second ladder sections, opposite said first ends, contact a floor when said combination ladder and hand truck is in an upright closed position and an extended downward position in which said wheels contact the floor when said combination ladder and hand truck is in said upright closed position.

Preferably, the combination foldable ladder and hand truck also includes a locking means for lockably maintaining the device in a closed position. The support means for supporting goods to be transported may take on a variety of forms but is preferably L-shaped so as to provide a back plate member and a support member against which transported goods may rest.

The retractable transport wheels may be attached to the combination foldable ladder and hand truck in a variety of ways. For example, the wheels may be attached to the support means such that when the support means is moved from its retracted position to its extended forward position, the wheels correspondingly move from their retracted position to their extended downward position. Alternatively, the support means may move independently from the transport wheels. In such an embodiment, the wheels are not attached to the support means but rather, are adjustably slidably lockably mounted to one of the ladder sections so as to permit movement in a direction parallel to the side rails of the ladder section. Such movement will generally exist between the retracted position of the wheels and the extended downward position of the wheels. In such an embodiment the support means is pivoted from its retracted position parallel to the ladder sections to its extended forward position perpendicular to the ladder sections so that goods may be placed upon it for transport.

The combination foldable ladder and hand truck may advantageously be used either as a folding ladder or as a hand truck. In use as a ladder, the first and second ladder sections, which are each joined at respective first ends to a hinge, are moved away from each other to an open position, thus forming a step ladder configuration. The hinge is lockable such that once a predetermined open position is reached the two ladder sections are held positionally fixed with respect to each other. In use as a ladder, the support means is in its retracted position since it is not needed for transporting goods and the transport wheels are also in their retracted position so as to provide a sturdy fixed relationship with respect to the ground. Thus, the device functions as a step ladder. Alternatively, the two ladder sections may be separated by 180 in which case an extension type ladder is formed. In use as an extension type ladder, the support means and transport wheels are also retracted.

In use as a hand truck, the first and second ladder sections are held in a closed position adjacent to each other by the locking means. The support means is in its extended forward position thereby providing a means for supporting and holding goods to be transported. The transport wheels are locked in their extended downward position so as to provide a means for the hand truck to be rolled along the ground.

The invention also relates to ladders having thereon wheel means to facilitate transportation of the ladder, thus permitting one person to transport, maneuver and place a ladder into a desired position and to generally permit transportation of the ladder without much effort. Further, the invention relates to hand trucks having retractable transport wheels and a retractable support means upon which the goods to be transported are placed. Such a hand truck is exceptionally stable as it is not prone to inadvertent rolling due to slightly tipping the hand truck. Advantageously, structural elements such as side rails and bracing means are shared in the present invention during use as a ladder and as a hand truck.

The preferred hinge means for use in this invention comprises a housing means having at least two halves rotatable with respect to each other about an axis of rotation, a first half for holding one of the side rails and a second half for holding the other side rail; means for mounting the housing halves for movement linearly along their axis of rotation between a first position and a second position; and interengaging means for preventing rotation of the housing halves when the housing halves are in the first position and permitting rotation of the housing halves when the housing halves are in the second position. Either one of the housing halves, or both, can include a mounting bracket for mounting on one of the side rails.

Preferably, the hinge also includes means for biasing the housing halves into the first position. The biasing means comprises a rod extending from the first housing half in a direction parallel to the axis of rotation, through an opening defined in a surface of the second housing half; and a cam engaging the surface and movable between a first position biasing the housing halves into their first position and a second position permitting movement of the housing halves to their second position.

The interengaging means of the invention may have a first set of adjacent ridges with a depression between each pair of adjacent ridges on the first housing half, where the apexes of the ridges point in a direction parallel to the axis of rotation; a second set of adjacent ridges on the second housing half also having a depression between each pair of adjacent ridges, with the apes of the ridges also extending parallel to the axis of rotation. The second set of ridges is located adjacent the apexes of the first set of ridges so that they are received in the depressions of the first set of ridges with the depressions of the second set of ridges receiving the apexes of the first set of ridges when the housing halves are in their first position. Advantageously, the first and second sets of ridges and depressions are mating teeth positioned to interengage when the housing halves are in their firs position and which are disengaged when the housing halves are in their second position.

The biasing means can also include a support extending from the first housing half in a direction parallel to the axis of the rotation; and a cam pivotably mounted on the support and engaging a surface of the second housing half, the cam being pivotable between a firs position urging the housing halves in their first position and a second position permitting movement of the housing halves to their second position. Preferably, the cam is made of nylon and has a lever to facilitate manual movement between its first and second position.

The hinge means may further include formations on an outer surface of one of the housing halves for engaging a stop block which is movably mounted to the other of the housing halves. The stop block is movable between a first position where it engages the formation to prevent relative rotation of the housing halves in one direction about the axis and a second position not engaged with the formation. The stop block is mounted to a spring steel member extending from the other housing half, so that the spring steel member biases the stop block into its first position.

BRIEF DESCRIPTION OF THE DRAWINGS

These and other objects, features and advantages of the invention will become more readily apparent with reference to the following figures in which like elements are numbered similarly and in which.

DETAILED DESCRIPTION OF THE INVENTION

Figure 1:
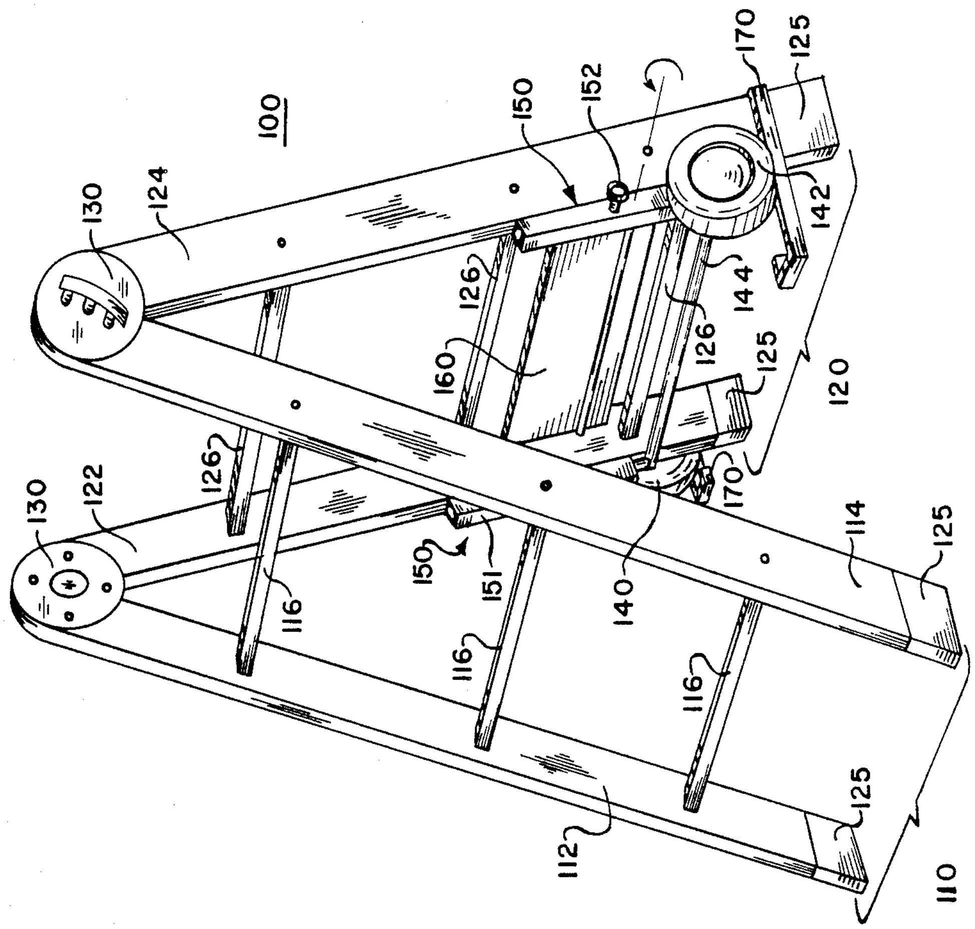
FIG. 1 is a perspective view of the first embodiment of the combination ladder and hand truck in an open position and functional as a step ladder.

FIG. 1 is an illustration of a first embodiment of the invention in which the combination ladder and hand truck is in an open position and functional as a ladder. The device 100 comprises a first ladder section 110, a second ladder section 120, a hinge means 130, a pair of transport wheels 140, 142, a wheel adjust means 150 and a support means 160.

First ladder section 110 comprises a pair of spaced apart side rails 112, 114 and a plurality of bracing members 116 connecting side rails 112, 114 to each other. Second ladder section 120 similarly comprises a pair of spaced apart side rails 122, 124 and a plurality of bracing members 126 connecting side rails 122, 124 to each other. The side rails are preferably constructed having a structural cross section such as an I-beam, channel, hollow rectangle, or the like. The bracing members are preferably ladder rungs having a non-slip surface. Side rails 112, 114 of first ladder section 110 and side rails 122, 124 of second ladder section 120 as well as the corresponding bracing members 116, 126, respectively, are preferably constructed of any lightweight and sufficiently sturdy material, illustratively an aluminum alloy or magnesium alloy. Side rails 112, 114, 122, and 124 are preferably provided with a wear resistant rubber-like material 125 on their lower end in order to produce frictional contact with the floor and also to protect the floor upon which it is placed.

Hinge means 130 connects a top, or first, end of first ladder section 110 to a top, or first, end of second ladder section 120. More specifically, hinge means 130 comprises two hinges, one connecting side rail 112 to side rail 122 and the other connecting side rail 114 to side rail 124. Hinge means 130 is preferably of the lockable type such that the combination ladder and hand truck is prevented from accidentally closing once opened to a desired position. An illustrative hinge means is disclosed in U.S. Pat. application Ser. No. 096,425 filed Sept. 11, 1987, now U.S. Pat. No. 4,793,503, and is preferably used with the present invention. Another preferred hinge is disclosed in the U.S. counterpart to South Korean patent application no. 19274, filed Nov. 7, 1987, the content of which is expressly incorporated herein by reference thereto. However, other types of known adjustable position hinges can be used.

Transport wheels 140, 142 are mounted onto axle 144 so as to rotate thereon. FIG. 1 depicts transport wheels 140, 142 and axle 144 in a retracted position so as to not contact the floor during use as a ladder. Rather, lower, or second, ends of the side rails of first and second ladder sections, which are covered with wear resistant rubber-like material 125, contact the floor.

Wheel adjust means 150 is provided to mount transport wheels 140, 142 and axle 144 to one of ladder sections 110, 120, illustratively section 120, such that the wheels may be adjustably positioned between their retracted position (as shown) during use as a ladder and an extended downward position during use as a hand truck. Wheel adjust means 150 comprises a hollow tubular member 151 and a rod member 153 (FIG. 3) which is at least partially insertable into tubular member 151. Tubular member 151 is provided with at least one bore therethrough while rod member 153 is provided with a plurality of mating bores therethrough, any of which may be aligned with the bore of tubular member 151. Wheel adjust means 150 further comprises lock pin 152 which is insertable into the aligned bores of tubular member 151 and rod member 153 so as to hold rod member 153 in a positionally fixed relationship with tubular member 151. Two preferable positionally fixed relationships relate to the retracted position (as shown) of the wheels and the extended downward position.

Support means 160 comprises a pivotable support member which pivots between a retracted position (as shown) during use as a ladder and an extended forward position during use as a hand truck. Support means 160 is pivotably attached to side rails 122, 124 of second ladder section and pivots towards first ladder section 110 during use as a hand truck.

A locking means 170 is provided to maintain the combination ladder and hand truck in a closed position. The locking means is attached to side rail 124 and is attachable to side rail 114 when the combination ladder and hand truck is in a closed position. A similar locking means is attached to side rail 122 and attachable to side rail 112.

In use of the device of FIG. 1, an operator preferably steps on bracing members, or rungs 116 of first ladder section 110 so as to avoid contact with transport wheels 140, 142 and support means 160 which are attached to the second ladder section 120.

Figure 2:
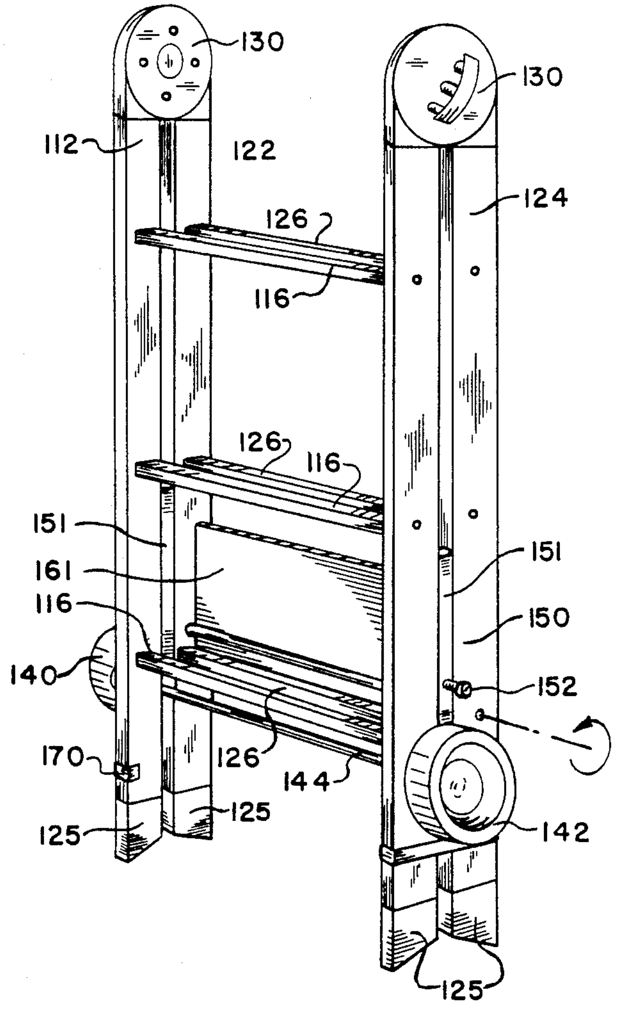
FIG. 2 is a perspective view of a first embodiment of a combination ladder and hand truck in a closed position and functional as a ladder.

Referring now to FIG. 2, there is depicted the device of FIG. 1 in a closed position and functional as a ladder. The configuration depicted in FIG. 2 is particularly well suited for use as a ladder which is leaned against a wall. As described in the description of FIG. 1, wheels 140, 142 are depicted in a retracted position in FIG. 2. Similarly, support means 160 is also depicted in its retracted position. Locking means 170 is shown in its locked position in which it maintains first ladder section 110 in an adjacent positionally fixed relationship with second ladder section 120. More particularly, a first locking means locks side rail 112 to side rail 122 while a second locking means locks side rail 114 to side rail 124. A wide variety of known locking means exist, the specific nature of which is not critical to an understanding of the present invention. Illustratively, locking means 170 comprises a strap member firmly attached to side rail 124 and detachably attached to side rail 114. Side rails 112, 122 are similarly provided with such a strap member. Alternatively, hinge means 130 may be provided with a lockable position in which the ladder is locked in a closed position.

In addition to the configurations depicted in FIGS. 1 and 2, the combination ladder and hand truck may be configured such that first and second ladder sections 110, 120, respectively, are separated by 180°, i.e., they are in a fully open co-linear position. In such a configuration, an extension-type ladder is formed. Advantageously, rod members 153 may be entirely removed from tubular members 151, thereby removing the wheels such that material 125 on side rails 122, 124 and not transport wheels 140, 142 will rest against the wall against which the ladder is placed.

Figure 3:
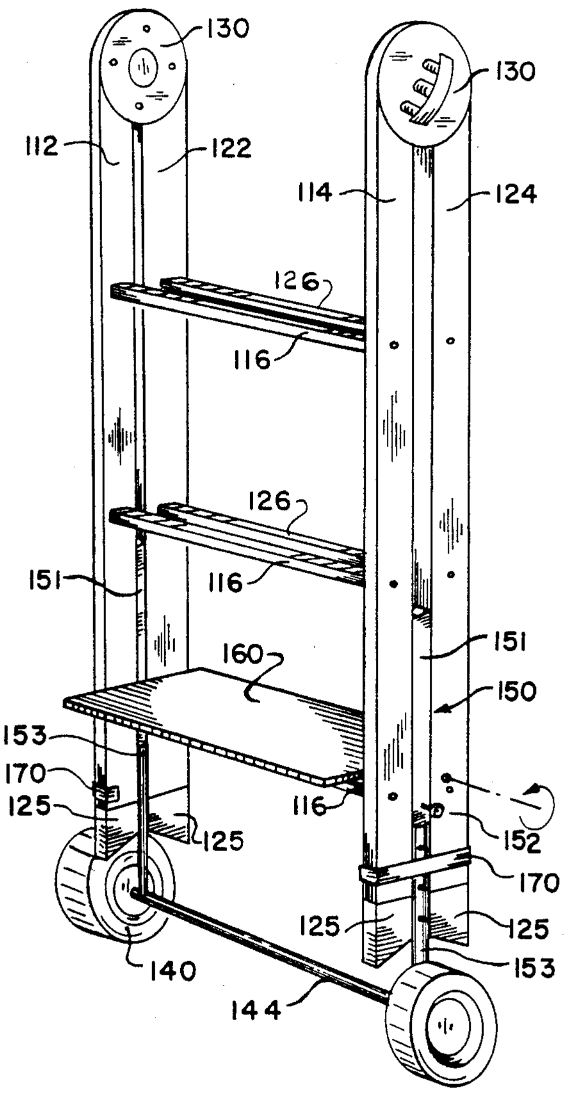
FIG. 3 is a perspective view of a first embodiment of a combination ladder and hand truck in a closed position and functional as a hand truck.

Referring now to FIG. 3, their is depicted the device of FIGS. 1 and 2 in a closed position and functional as a hand truck. As described in the description of FIG. 2, first ladder section 110 is firmly attached to second ladder section 120 by two locking means 170 or, alternatively, by an appropriate locked position of hinge means 130. Transport wheels 140, 142 are in their extended downward position and locked in such position by the alignment of the bores in tubular member 151 and rod member 153 and insertion of lock pin 152 into the aligned bores. Additionally, the support means is pivoted approximately 90° from its retracted vertical position to its extended forward position.

Advantageously, support means 160 rests on one of rungs 116 of the first ladder section so as to provide a limit to its movement. Alternatively, stop blocks may be attached to inner surfaces of side rails 112, 114 which serve to contact the underside of support means 160, thereby limiting its movement to a position perpendicular to first ladder section 110. Furthermore, an optional back plate may be fixedly mounted in a position directly behind retracted support means 160 such that when support means 160 is extended forward, an L-shaped configuration is formed. Such an L-shaped configuration is advantageous for transporting goods narrower than the separation between side rails 112 and 114. The optional back plate is not necessary for goods wider than the separation between side rails 112 and 114 since those side rails will serve as a back plate rearward of which the transported goods can not move.

Figure 4:
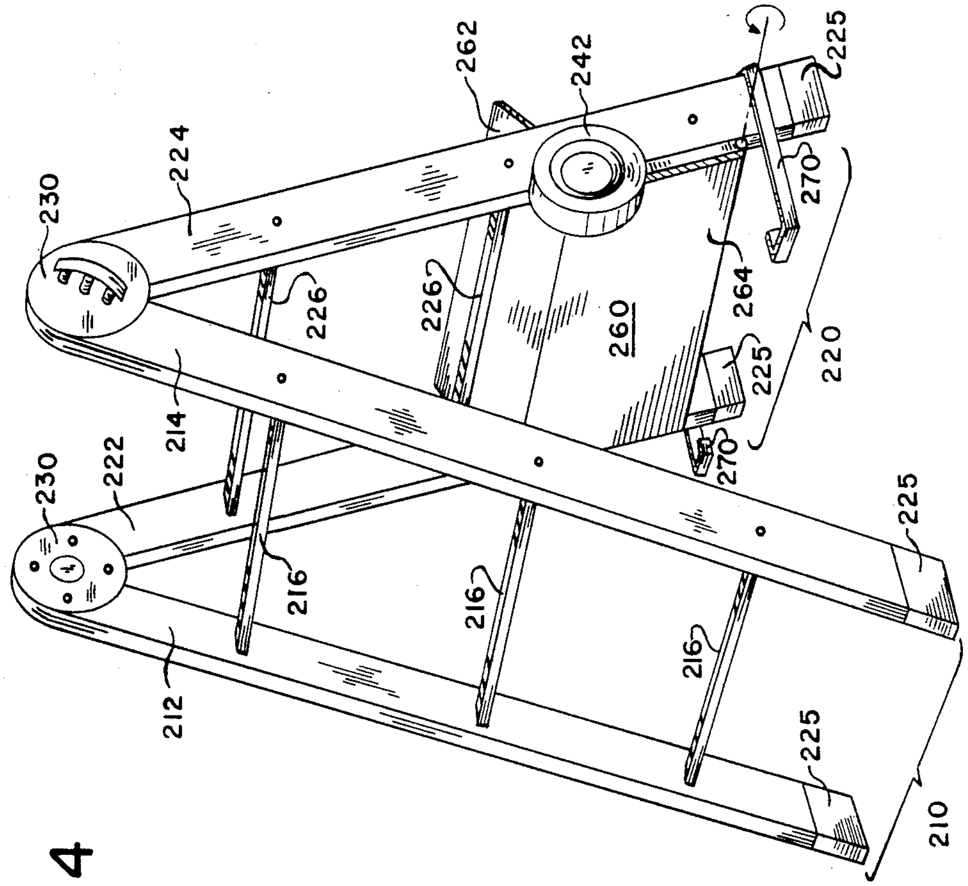
FIG. 4 is a perspective view of a second embodiment of a combination ladder and hand truck in an open position and functional as a step ladder.

FIG. 4 is an illustration of a second embodiment of the invention in which the combination ladder and hand truck is in an open position and functional as a ladder. The device 200 comprises a first ladder section 210, a second ladder section 220, a hinge means 230, a pair of transport wheels 240, 242 and a support means 260.

First ladder section 210 comprises a pair of spaced apart side rails 212, 214 and a plurality of bracing members or rungs 216. Second ladder section 220 similarly comprises a pair of spaced apart side rails 222, 224 and a plurality of bracing members or rungs 226. Side rails 212, 214, 222 and 224 are similar in function and structure and correspond to side rails 112, 114, 122 and 124, respectively, of FIGS. 1, 2 and 3.

Hinge means 230 connects a top, or first, end of first ladder section 210 to a top, or first, end of second ladder section 220. More specifically, hinge means 230 comprises two hinges, one connecting side rail 212 to side rail 222 and the other connecting side rail 214 to side rail 224. Hinge means 230 is similar in function and structure and corresponds to hinge means 130 of FIGS. 1, 2 and 3.

Support means 260 comprises a back plate member 264 and a support member 262 arranged to form an L-shape. Advantageously, the back plate member is wider than the support member such that the support member is retractable into a space between the side rails to which it is attached. The back plate member is not retractable into such space, rather, its movement is limited by the side rails. Support member 260 is pivotably mounted to one of ladder sections 210, 220 along an edge of back plate member 264 as indicated by the pivot axis in FIG. 4.

The particular ladder section to which support means 260 is mounted as well as its orientation depends on a number of considerations such as the width of the support means, the separation between the two side rails of a ladder section, the existence of rungs within the arc encountered during a pivot of the support means, the manner of attachment of transport wheels, the type of locking means employed, etc. In the illustrative embodiment depicted, support means 260 is pivotally mounted to the second ladder section 220, along a pivot axis as indicated. As is apparent, in such an embodiment the support means may be pivoted from its retracted position as shown to its extended forward position by pivoting the support means 180° in a direction at least initially toward first ladder section 210.

Any of a wide variety of known locking means may be utilized to maintain support means 260 in its retracted position when the combination ladder and hand truck is in its open position as shown in FIG. 4. As will become apparent, when the device is in its closed position side rails 212, 214, 222 and 224 will maintain support means 260 in a fixed position.

Transport wheels 240, 242 are rotatably mounted to support means 260 at points on opposite sides of the edge joining support member 262 to back plate member 264. FIG. 4 depicts transport wheels 240, 242 in a retracted position so as to not contact the floor during use as a ladder. Rather, lower, or second, ends of the side rails of the first and second ladder sections, which are covered with wear resistant rubber-like material 225, contact the floor.

As is apparent, the retracted position of support means 260 corresponds to the retracted position of transport wheels 240, 242; such a retracted position is provided for use as a ladder. Similarly, the extended forward position of the support means corresponds to an extended downward position of the transport wheels for use as a hand truck.

A locking means 270 is provided to maintain the combination ladder and hand truck in a closed position. The locking means is attached to side rail 224 and is attachable to side rail 214 when the device is in a closed position. A similar locking means is attached to side rail 222 and attachable to side rail 212.

In use of the device of FIG. 4, an operator preferably steps on bracing members, or rungs, 126 of first ladder section 210 so as to avoid contact with transport wheels 240, 242 and support means 260 which are attached to second ladder section 220.

Figure 5:
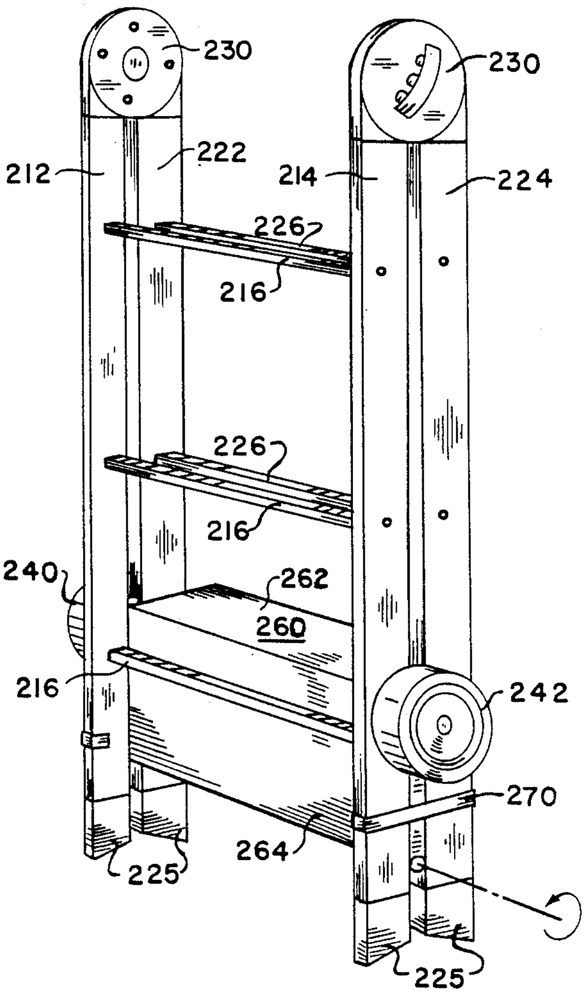
FIG. 5 is a perspective view of a second embodiment of a combination ladder and hand truck in a closed position and functional as a ladder.
Figure 6:
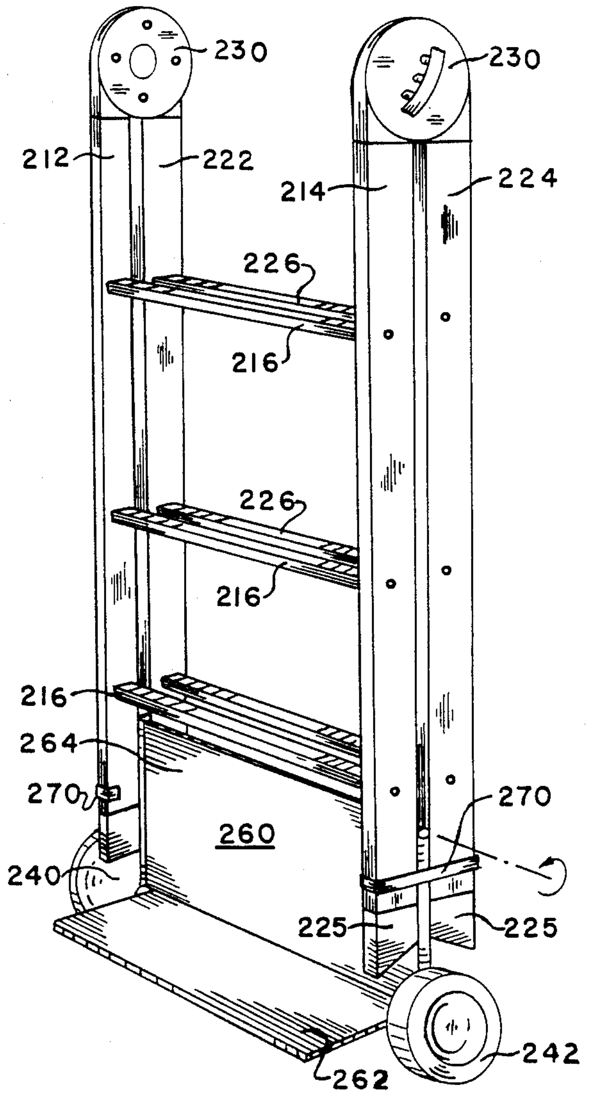
FIG. 6 is a perspective view of a second embodiment of a combination ladder and hand truck in a close position and functional as a hand truck.

Referring now to FIG. 5, there is depicted the device of FIG. 4 in a closed position and functional as a ladder. The configuration depicted in FIG. 5 is particularly well suited for use as a ladder which is leaned against a wall. As described in the description of FIG. 4, wheels 240, 242 are depicted in a retracted position in FIG. 5. Similarly, support means 260 to which wheels 240, 242 are attached is also depicted in its retracted position. Locking means 270 is shown in its locked position in which it maintains first ladder section 210 in an adjacent positionally fixed relationship with second ladder section 220. More particularly, a first locking means locks side rail 212 to side rail 222 while a second similar locking means locks side rail 214 to side rail 224. Locking means 270 of FIGS. 4, 5 and 6 is similar in structure and function to locking means 170 depicted in Figs. 1, 2 and 3. Alternatively, hinge means 230 may be provided with a lockable position in which the ladder is locked in a closed position.

Advantageously, support means 260 rests between the side rails of the first ladder section and the side rails of the second ladder section so as to be provided with a limit to its movement during a closed position of the ladder. Alternatively, stop blocks may be attached to the side rails to contact support means 260, thereby limiting its movement.

In addition to the configurations depicted in FIGS. 4 and 5, the combination ladder and hand truck may be configured such that first and second ladder sections 210, 220, respectively, are separated by 180°, i.e., they are in a fully open co-linear position. In such a configuration, an extension-type ladder is formed.

Referring now to FIG. 6, there is depicted the device of FIGS. 4 and 5 in a closed position and functional as a hand truck. As described in the description of FIG. 5, first ladder section 210 is firmly attached to second ladder section 220 by locking means 270 or, alternatively, by an appropriate locked position of hinge means 230. Transport wheels 240, 242 are in their extended downward position. Additionally, the support means is pivoted approximately 180° from its retracted vertical position to its extended forward position.

By maintaining support means 260 between the side rails of the first ladder section and the side rails of the second ladder section and maintaining the combination ladder and hand truck in its closed position, the support means will be prevented from pivoting, and further, the transport wheels will be locked in their retracted or extended downward position (as shown).

FIGS. 7–10 illustrate a preferred hinge for use in the various embodiments of the invention. These FIGS. describe a hinge 300 for use in joining and holding two structural members together at a predetermined angular orientation. The preferred use for hinge 300 is for coupling together two ladder side rails 310, 320 for use as part of the handtruck of the invention.

Figure 7:
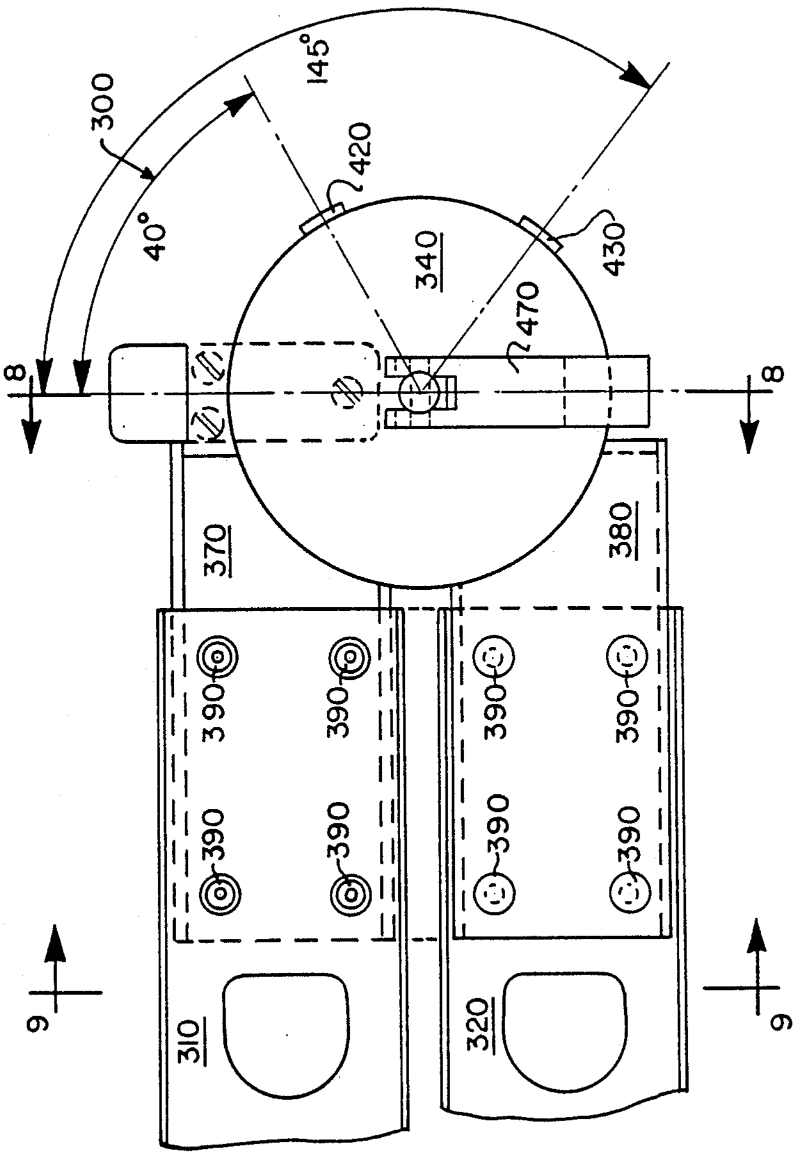
FIG. 7 is a side view of a hinge according to the invention.

The inventive hinge 300 is composed of two symmetric circular housing halves 330, 340, each having a mounting bracket for mounting ladder side rails 310, 320 thereto by attachment means, namely screws (if wooden ladder side rails are used) or rivets (for metal ladder side rails) which pass through apertures 350, 360 in the mounting brackets 370, 380. As shown in FIG. 7, aluminum ladder side rails 310, 320 are preferred, and rivets 390 are utilized to attach the mounting brackets to the side rails.

Figure 10:
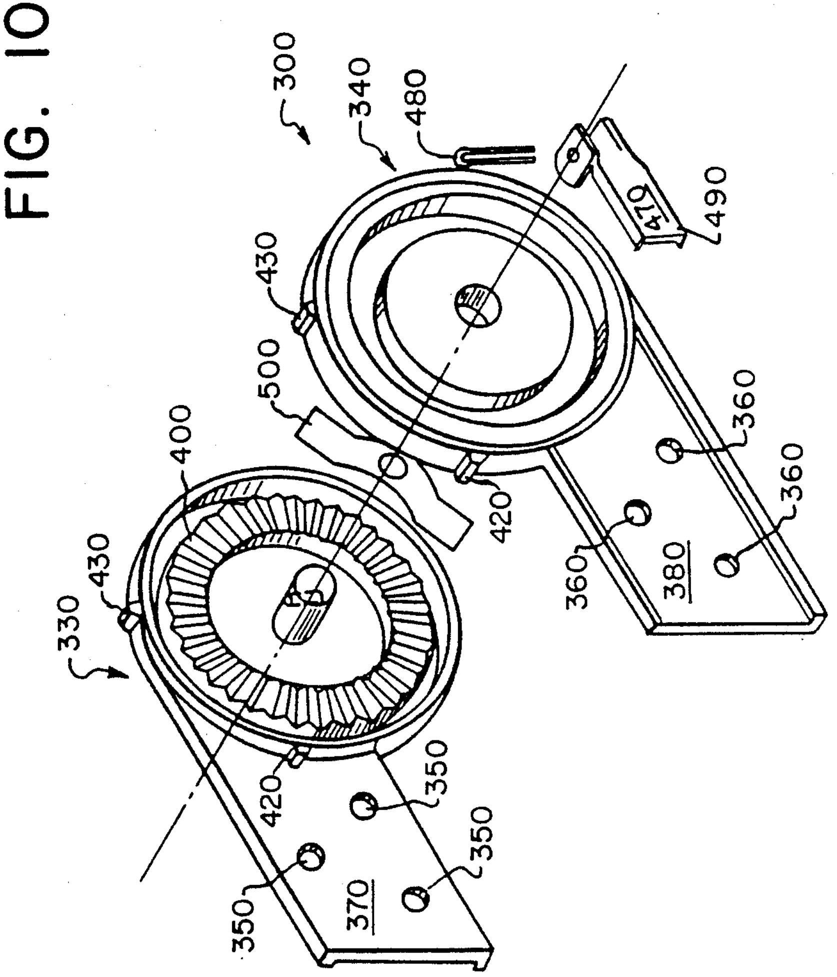
FIG. 10 is an exploded perspective view of the hinge of FIG. 7 to illustrate its component parts.

As best illustrated in FIG. 10, the housing halves each contain a circular array of teeth 400, 410 extending radially around the center of the halves. These teeth matingly engage when the halves are brought together with the apexes of the teeth of one housing half fitting in the depressions formed between the apexes of the teeth on the other housing half. When brought together, the housing halves cannot rotate with respect to one another, so that the ladder side rails are maintained at a particular angle, which can vary depending upon the number of teeth provided on each housing half. For example, if 30 equal sized teeth are provided, then the ladder stringers can assume any angle from 0° to 340° in 20° increments. The number of teeth can vary depending upon the precision needed for the angular relation between the ladder side rails.

Usually, a certain limited number of angular orientations are preferred, such as, for example 40°, 145°, and 180° from the vertical. The present hinge provides an assembly for easily positioning the ladder side rails at these orientations. This assembly includes a plurality of stop blocks 420, 430 which are located at the desired angles of 40° and 145° (with respect to vertical), along with spring member 440, a flat section of spring steel, and pin stop 450, the operation of which will be described hereinbelow. One skilled in the art can provide as many stop blocks as necessary, while inventor has presently found that between two and four, preferably three, are sufficient for most applications.

Figure 9:
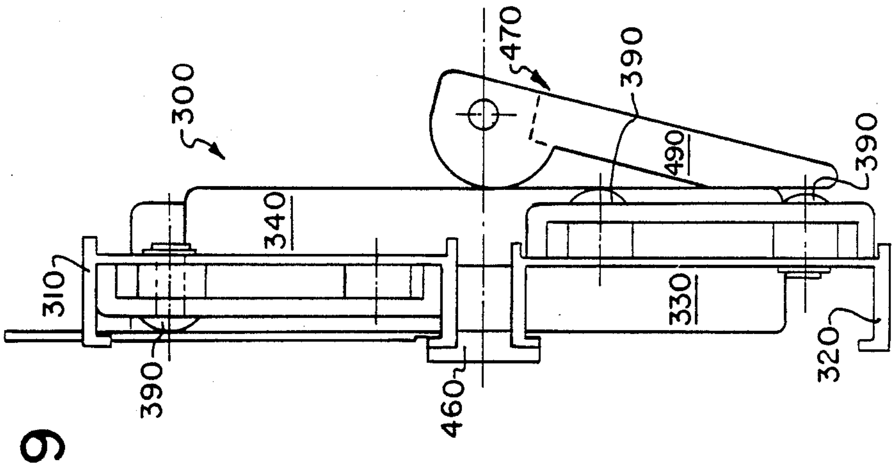
FIG. 9 is a side view of the hinge taken along line 9—9 of FIG. 7.
Figure 8:
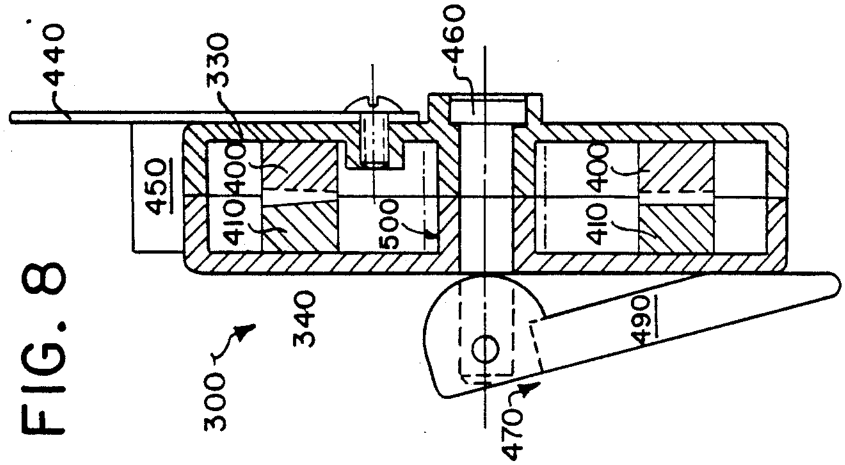
FIG. 8 is a cross sectional view taken along lines 8—8 of FIG. 7.

The housing halves 330, 340 are maintained in the engaged position by the use of a novel pin and cam lock arrangement, and this maintains the side rails at the desired angle. Pin 460 extends through the center of each housing half 330, 340, for connection to cam lock 470 by cotter pin 480. By placing the cam lock 470 in a locking or closed position, as best illustrated in FIG. 8 and 9 the two housing halves are pushed together by pin 460 and cam lock 470, so that the side rails cannot change their angular orientation. The cam lock 470 will retain the side rails at the precise angle until it is moved to an unlocked or open position.

The lever 490 of the cam lock 470 is pulled upward until it extends in the same direction as pin 460. Then, due to the shape of the cam surface, the closing forces exerted by pin 460 and cam lock 470 are released, so that the housing halves may separate by slightly moving away from each other. Cotter pin 480 allows the cam lever 490 to be opened and close, but maintains the connection between the pin 460 and the cam lock 470 so that the housing halves do not fall away from each other. In this arrangement, the cam lock 470 can be molded from an engineering thermoplastic, such as nylon, while pins 460 and 480 are made of a suitable metal such as steel or aluminum.

To assist in separating the housing halves when the forces are released by opening the cam lever 490, a small spring 500, preferably of a bent strip of spring steel, is mounted on pin 460 between the housing halves such that, when the housing halves are brought together, the spring 500 is compressed. Thus, when the cam lock 470 is released, spring 500 provides sufficient force to separate the housing halves so that they can freely rotate around pin 460. To obtain one of the preset angles, the halves are rotated until stop pin 450 hits the appropriate stop block. To rotate the housings beyond the firs stop block 420, spring member 440 is pulled back (in the same direction as the cam lever) so that the stop pin 450 can move around stop block 420. After clearing the stop block 420, the spring member 440 is returned to its original position and the housing halves continue to rotate until stop in 450 engages the next stop block 430.

The inventive hinge is thus ideally suited for simply and rapidly adjusting the angle between side rails to predetermined positions in a convenient and easy operation, thus providing significant advantages over prior art hinges.

While it is apparent that the invention herein disclosed is well calculated to fulfill the objects above stated it will be appreciated that numerous modifications and embodiments may be devised by those skilled in the art, and it is intended that the appended claims cover all such modifications and embodiments as fall within the true spirit and scope of the present invention.

More specifically, three, four or even more ladder sections can be included in the combination ladder and hand truck, with the two side rails of each ladder section being connected to the respective two side rails of an adjacent ladder section by hinge means. Such multiple section ladders can form and be maintained in a wide variety of configurations for use as scaffolding or other support structures. Furthermore, the support means and transport wheels may be attached to the ladder sections in a variety of ways and may take on a variety of forms. For example, the support means may be attached to either of the ladder sections depending on the desired direction in which it will pivot as well as the amount of pivot. The support means may be at least as narrow as the distance separating the two side rails as illustrated in FIGS. 1, 2 and 3 so as to permit pivoting within a space between the side rails. In such an embodiment, the limit of movement in the extended forward position is defined by the ladder rungs or stop blocks against which the support means rests. In the embodiment depicted in FIGS. 4, 5 and 6, the back plate member is wider than the support member so as to permit the support member to retract into a space between the side rails but to prevent the back plate member from doing so. Advantageously, the back plate member thus serves to prevent pivoting of the support means during a closed position of the hand truck, whether the support means is retracted or extended forward. As will be appreciated, a wide variety of support means and methods of attachment are possible and within the scope of the claimed invention. Additionally, the transport wheels may be mounted outside or inside with respect to the side rails. Handle means may be attached to the first end of the side rails for grasping by the operator during use as a hand truck or for transport during use as an easily transportable rollable ladder.

What is claimed is:

1. A combination foldable ladder and hand truck comprising:

a plurality of ladder sections, each having a pair of spaced apart side rails and a plurality of spaced apart rungs joining said pair of spaced apart side rails;

hinge means for connecting one end of a first ladder section to one end of a second ladder section and for maintaining said ladder sections in any one of a plurality of positions, said first ladder section being movable away from said second ladder section to an open co-linear position wherein said first and second ladder sections form an extension ladder, said first and second ladder sections being movable toward each other to at least one intermediate position wherein a V-shaped stepladder is formed, said first ladder section being parallel to and adjacent said second ladder section in a closed position;

means for support of goods, said support means having a retracted position at least partially within said side rails of said first and second ladder sections and an extended forward position at least partially extending forward of one of said first and second ladder section side rails; and means for transport of said combination and goods, said transport means movable between a retracted position in which said transport means is inoperative and an extended downward position for engaging a surface for movement of said combination and goods thereacross, wherein a hand truck is formed when said ladder sections are in said closed position, said support means is in said extended forward position and said transport means is in said extended downward position.

2. The combination foldable ladder and hand truck of claim 1 wherein said hinge means further comprises means for locking said ladder sections in any of a plurality of angular positions therebetween, including said open and closed positions.

3. The combination foldable ladder and hand truck of claim 2 wherein said locking means comprises a member for fastening said first ladder section in said closed position to said second ladder section.

4. The combination foldable ladder and hand truck of claim 1, wherein said support means comprises a plate member pivotably attached near an end of one of said ladder sections opposite said hinge means.

5. A combination foldable ladder and hand truck comprising:

a plurality of ladder sections, each having a pair of spaced apart side rails and a plurality of spaced apart rungs joining said pair of spaced apart side rails;

hinge means connecting one end of a first ladder section to one end of a second ladder section, said first ladder section being movable away from said second ladder section to an open position and said first ladder section being parallel to and adjacent said second ladder section in a closed position;

means for support of goods, said support means having a retracted position at least partially within said side rails of said first and second ladder sections and an extended forward position at least partially extending forward of one of said first and second ladder section side rails; and means for transport of said combination and goods, said transport means movable between a retracted position in which said transport means is inoperative and an extended downward position for engaging a surface for movement of said combustion and goods thereacross;

wherein said support means comprises a plate member pivotably attached near an end of one of said ladder sections opposite said hinge means and wherein said transport means comprises a pair of wheels attached to opposite sides of said plate member.

6. The combination foldable ladder and hand truck of claim 4, wherein said plate member comprises a back plate member and a support member extending perpendicularly thereto, thus forming an L-shaped member.

7. The combination foldable ladder and hand truck of claim 6, wherein said back plate member is parallel to said ladder sections in either of said retracted or extended forward positions, and wherein said support member is perpendicular to and rearwardly extending with respect to said ladder sections when said combination is in said retracted position, and wherein said support member is perpendicular to and forwardly extending with respect to said ladder sections when said combination is in said extended forward position.

8. The combination foldable ladder and hand truck of claim 7, wherein said support means rotates approximately 180° between said retracted and extended forward positions.

9. The combination foldable ladder and hand truck of claim 1, wherein said support means comprises an L-shaped support member and said transport means comprises a pair of wheels attached to opposite sides of said support member.

10. The combination foldable ladder and hand truck of claim 4, wherein said support member is parallel to said ladder sections in said retracted position and perpendicular to said ladder sections in said extended forward position.

11. The combination foldable ladder and hand truck of claim 10, wherein said support means is rotated approximately 90° between said retracted and extended forward positions.

12. A combination foldable ladder and hand truck comprising:

a plurality of ladder sections, each having a pair of spaced apart side rails and a plurality of spaced apart rungs joining said pair of spaced apart side rails;

hinge means connecting one end of a first ladder section to one end of a second ladder section, said first ladder section being movable away from said second ladder section to an open position and said first ladder section being parallel to and adjacent said second ladder section in a closed position;

means for support of goods, said support means having a retracted position at least partially within said side rails of said first and second ladder sections and an extended forward position at least partially extending forward of one of said first and second ladder section side rails; and means for transport of said combination and goods, said transport means movable between a retracted position in which said transport means is inoperative and an extended downward position for engaging a surface for movement of said combination and goods thereacross;

wherein said support means comprises a support member which is parallel to said ladder sections in said retracted position and perpendicular to said ladder sections in said extended forward position, and wherein said support means rotates approximately 90° between said retracted and extended forward positions, said transport means further comprising a pair of wheels which are adjustably slidably lockably mounted to one of said ladder sections so as to permit movement in a direction parallel to said side rails of the attached ladder section, said movement being provided between said retracted position and said extended downward position.

13. The combination foldable ladder and hand truck of claim 1, wherein said hinge means comprises:

a housing means having at least two halves rotatable with respect to each other about an axis of rotation, a first half for holding one of said sections and a second for holding the other section;

means for mounting said housing halves for movement linearly along said axis of rotation between first and second positions along said axis of rotation;

interengaging means for preventing rotation of said housing halves when said housing halves are in said first position and permitting rotation of said housing halves when said housing halves are in said second position; and means for positioning said housing halves at one of a plurality of predetermined angular relationships therebetween, said positioning means mounted upon one of said housing halves and capable of engaging said other half so that said positioning means in a first position normally prevents relative rotation between said halves by engaging said other housing half, and in a second position wherein said positioning means does not engage said other housing half to permit angular rotational movement between the housing halves.

14. The combination foldable ladder and hand truck of claim 1, wherein said hinge means comprises:

a first housing half having a bracket for mounting a portion of one of said sections;

a second housing half movably mounted to said first housing half, and having a bracket for mounting a portion of the other of said sections;

means for movably mounting said first and second housing halves for rotation with respect to each other about a predetermined axis of rotation and for linear movement with respect to each other along said axis of rotation;

interengaging means for preventing rotation of said first and second housing halves when said housing halves are in a first position with respect to one another along said axis of rotation and permitting rotation of said housing halves when said housing halves are in a second position along said axis of rotation; and means for biasing said housing halves into said first position when said biasing means are engaged and permitting movement of said housing halves to said second position when said biasing means is disengaged.

15. A combination foldable ladder and hand truck comprising:

a plurality of ladder sections, each having a pair of spaced apart side rails and a plurality of spaced apart rungs joining said pair of spaced apart side rails;

hinge means connecting one end of a first ladder section to one end of a second ladder section, said first ladder section being movable away from said second ladder section to an open position and said first ladder section being parallel to and adjacent said second ladder section in a closed position;

means for support of goods, said support means having a retracted position at least partially within said side rails of said first and second ladder sections and an extended forward position at least partially extending forward of one of said first and second ladder section side rails; and means for transport of said combination and goods, said transport means movable between a retracted position in which said transport means is inoperative and an extended downward position for engaging a surface for movement of said combination and goods thereacross;

wherein said hinge means comprises:

a first housing half having a bracket for mounting a portion of one of said sections;

a second housing half movably mounted to said first housing half, and having a bracket for mounting a portion of the other of said sections;

means for movably mounting said first and second housing halves for rotation with respect to each other about a predetermined axis of rotation and for linear movement with respect to each other along said axis of rotation;

interengaging means comprising a first set of teeth on said first housing half and a second set of mating teeth on said second housing half which teeth interengage to prevent rotation of said first and second housing halves when said housing halves are in a first position with respect to one another along said axis of rotation and disengage to permit rotation of said housing halves when said housing halves move toward a second position along said axis of rotation; and means for biasing said housing halves into said first position when said biasing means are engaged and for permitting movement of said housing halves to said second position when said biasing means is disengaged, comprising a support extending from said first housing half in a direction parallel to said axis of rotation and a cam pivotably mounted on said support and engaging a surface of said second housing half, said cam being pivotable between a first position urging said housing halves in their first position and a second position permitting movement of the housing halves to their second position, said beam being made of nylon and having a lever to facilitate manual movement between its first and second position; and wherein an outer surface of one of said housing halves includes formations thereon for engaging a stop block; and further wherein the other of said housing halves has mounted thereon a stop block movable between a first position where it engages said formations to prevent relative rotation of the housing halves in one direction about said axis and a second position not engaged with said formation which permits free rotation of the housing halves along the axis of rotation.

16. A rollable ladder comprising:

a first ladder section having a pair of spaced apart side rails and a plurality of spaced apart ladder rungs joining said pair of spaced apart side rails;

at least one additional ladder section attached to said first ladder section in an end to end manner wherein an end of each of said ladder sections is attached by hinge means, said ladder sections capable of assuming a plurality of angular positions including an open co-linear position where said ladder sections form an extension ladder, more than one intermediate positions where said ladder sections form a V-shaped stepladder, and a closed position wherein said ladder sections are parallel to and adjacent each other; and a pair of transport wheels retractably attached to one ladder section, wherein said transport wheels are movable linearly between a retracted position in which an end of said ladder is in contact with a surface and an extended downward position in which said transport wheels are in contact with the surface.

17. A combination ladder and hand truck comprising:

first and second ladder sections, each such section having a pair of spaced apart side rails and a plurality of ladder rungs joining said pair of spaced apart side rails to each other;

lockable hinge means connecting a first end of said first ladder section to a first end of said second ladder section in an end to end manner;

means for support of goods, said support means being retractably attached to a second end, opposite said first end, of one of said ladder sections, and being positionable in a retracted position and an extended forward position;

a pair of transport wheels retractably attached to a second end, opposite said first end, of one of said ladder sections, and being positionable in a retracted position and an extended downward position;

wherein said locable hinge means comprises:

a first housing half having a bracket for mounting a portion of one of said sections;

a second housing half movably mounted to said first housing half, and having a racket for mounting a portion of the other of said sections;

means for movably mounting said first and second housing halves for rotation with respect to each other about a predetermined axis of rotation and for linear movement with respect to each other along said axis of rotation;

interengaging means comprising a first set of teeth on said first housing half and a second set of mating teeth on said second housing half which teeth interengage to prevent rotation of said first and second housing halves when said housing halves are in a first position with respect to one another along said axis of rotation and disengage to permit rotation of said housing halves when said housing halves move toward a second position along said axis of rotation; and means for biasing said housing halves into said first position when said biasing means are engaged and for permitting movement of said housing halves to said second position when said biasing means is disengaged, comprising a support extending from said first housing half in a direction parallel to said axis of rotation and a cam pivotably mounted on said support and engaging a surface of said second housing half, said cam being pivotable between a first position urging said housing halves in their first position and a second position permitting movement of the housing halves to their second position, said cam being made of nylon and having a lever to facilitate manual movement between its first and second position; and wherein an outer surface of one of said housing halves includes formations thereon for engaging a stop block; and further wherein the other of said housing halves has mounted thereon a stop block movable between a first position where it engages said formations to prevent relative rotation of the housing halves in one direction about said axis and a second position not engaged with said formation which permits free rotation of the housing halves along the axis of rotation.

18. The ladder of claim 16 further comprising means for support of goods to be transported, said support means retractably attached to one of said ladder sections, wherein said support means is movable between a retracted position at least partially within said side rails of said ladder sections and an extended forward position at least partially extending forward of said side rails.

19. The ladder of claim 16 wherein said hinge means comprises:

a housing means having at least two halves rotatable with respect to each other about an axis of rotation, a first half for holding one of said sections and a second for holding the other section;

means for mounting said housing halves for movement linearly along said axis of rotation between first and second positions along said axis of rotation;

interengaging means for preventing rotation of said housing halves when said housing halves are in said first position and permitting rotation of said housing halves when said housing halves are in said second position; and means for positioning said housing halves at one of a plurality of predetermined angular relationships therebetween, said positioning means mounted upon one of said housing halves and capable of engaging said other half so that said positioning means in a first position normally prevents relative rotation between said halves by engaging said other housing half, and in a second position wherein said positioning means does not engage said other housing half to permit angular rotational movement between the housing halves.

20. A hand truck comprising:

a plurality of interconnected ladder sections, each having a pair of spaced apart side rails and a plurality of spaced apart bracing members joining said side rails to each other; and support means for supporting goods to be transported, said support including means for transport of goods attached to a pair of spaced apart side rails of one ladder section at an end thereof proximate to said support means, said transport means movable in a direction parallel to the side rails to which it is attached to one of a plurality of positions including a retracted position in which said transport means is inoperative and one or more extended downward positions for engaging a surface for movement of said goods thereacross.

21. The hand truck of claim 20 wherein at least two ladder sections are interconnected by hinge means for locking.

22. The hand truck of claim 20 wherein said hinge means comprises:

housing means having at least two halves rotatable with respect to each other about an axis of rotation, a first half for holding one of said sections and a second for holding the other section;

means for mounting said housing halves for movement linearly along said axis of rotation between first and second positions along said axis of rotation;

interengaging means for preventing rotation of said housing halves when said housing halves are in said first position and permitting rotation of said housing halves when said housing halves re in said second position; and means for positioning said housing halves at one of a plurality of predetermined angular relationships therebetween, said positioning means mounted upon one of said housing halves and capable of engaging said other half so that said positioning means in a first position normally prevents relative rotation between said halves by engaging said other housing half, and in a second position wherein said positioning means does not engage said other housing half to permit angular rotational movement between the housing halves.

23. The hand truck of claim 20 wherein said ladder sections are secured to each other by a locking bracket.

24. The hand truck of claim 20 wherein said transport means includes a pair of wheels and means to adjust and lock said wheels in one of said plurality of positions.

25. A combination ladder and hand truck comprising:

first and second ladder sections, each such section having a pair of spaced apart side rails and a plurality of ladder rungs joining said pair of spaced apart side rails to each other;

lockable hinge means connecting a first end of said first ladder section to a first end of said second ladder section in an end to end manner;

means for support of goods, said support means being retractably attached to a second end, opposite said first end, of one of said ladder sections, and being movable from a retracted position to an extended forward position; and a pair of transport wheels retractably attached to a second end, opposite said first end, of one of said ladder sections, and being positionable in a retracted position and an extended downward position;

whereby movement of said transport wheels from said retracted position to said extended downward position enables said support means to move from said retracted position to said extended forward position.

26. The combination ladder and hand truck of claim 25 further comprising at least one additional ladder section and hinge means connected to said first and second ladder sections in an end to end manner.

27. The combination ladder and hand truck of claim 26 further comprising at least one additional pair of transport wheels attached to said additional ladder section.

28. The combination ladder and hand truck of claim 25 wherein said lockable hinge means comprises:

housing means having at least two halves rotatable with respect to each other about an axis of rotation, a first half for holding one of said sections and a second for holding the other section;

means for mounting said housing halves for movement linearly along said axis of rotation between first and second positions along said axis of rotation;

interengaging means for preventing rotation of said housing halves when said housing halves are in said first position and permitting rotation of said housing halves when said housing halves are in said second position; and means for positioning said housing halves at one of a plurality of predetermined angular relationships therebetween, said positioning means mounted upon one of said housing halves and capable of engaging said other half so that said positioning means in a first position normally prevents relative rotation between said halves by engaging said other housing half, and in a second position wherein said positioning means does not engage said other housing half to permit angular rotational movement between the housing halves.

29. The combination ladder and hand truck of claim 25 wherein said lockable hinge means comprises:

a first housing half having a bracket for mounting a portion of one of said sections;

a second housing half movably mounted to said first housing half, and having a bracket for mounting a portion of the other of said sections;

means for movably mounting said first and second housing halves for rotation with respect to each other about a predetermined axis of rotation and for linear movement with respect to each other along said axis of rotation;

interengaging means for preventing rotation of said first and second housing halves when said housing halves are in a first position with respect to one another along said axis of rotation and permitting rotation of said housing halves when said housing halves are in a second position along said axis of rotation; and means for biasing said housing halves into said first position when said biasing means are engaged and permitting movement of said housing halves to said second position when said biasing means is disengaged.

30. A combination foldable ladder and hand truck comprising:

two ladder sections, each having a pair of spaced apart side rails and a plurality of spaced apart rungs, joining said pair of spaced apart side rails;

hinge means for connecting and lockably maintaining said ladder sections in any of a plurality of angular positions therebetween including an open co-linear position where said ladder sections form an extension ladder, one or more intermediate positions where said ladder sections form a V-shaped stepladder; and a closed position where said ladder sections are parallel to and adjacent each other; and means for support and transport of goods, said means movable between a retracted position at least partially within said side rails of said ladder sections for compact storage thereof, to an extended forward portion at least partially extending forward of one of said ladder sections, and in contact with a surface for support transport of said goods thereacross.

31. The combination foldable ladder and hand truck of claim 30, wherein said transport means comprises an L-shaped plate member having a wheel attached to each opposite side thereof.

* * * * *